US005625569A

United States Patent [19]
Trimmer et al.

[11] Patent Number: 5,625,569
[45] Date of Patent: Apr. 29, 1997

[54] LOW POWER FLOW MEASURING DEVICE

[75] Inventors: Walter L. Trimmer, Corvallis; Benjamin A. Flugstad, McMinnville, both of Oreg.

[73] Assignee: Trimmer Engineering, Inc., Corvallis, Oreg.

[21] Appl. No.: 377,422

[22] Filed: Jan. 23, 1995

[51] Int. Cl.[6] .................................................. G06F 1/32
[52] U.S. Cl. .................. 364/492; 364/707; 364/273.1; 364/273.2; 364/273.3; 364/273.5; 364/948.4; 364/948.6; 364/948.7; 364/948.8; 364/948.91; 364/DIG. 1; 364/DIG. 2
[58] Field of Search ........................... 364/492, 510, 364/707, 273, 273.1, 273.2, 273.3, 273.4, 948.4, 948.5, 948.6, 948.7, 948.8, 948.91, DIG. 1, DIG. 2

[56] References Cited

U.S. PATENT DOCUMENTS

| | | | |
|---|---|---|---|
| 4,665,398 | 5/1987 | Lynch et al. | 340/853.9 |
| 4,745,564 | 5/1988 | Tennes et al. | 364/566 |
| 4,831,558 | 5/1989 | Shoup et al. | 364/55 |
| 4,980,836 | 12/1990 | Carter et al. | 364/483 |
| 5,091,863 | 2/1992 | Hungerford et al. | 354/510 |
| 5,132,904 | 7/1992 | Lamp | 364/422 |
| 5,360,095 | 11/1994 | Speas | 194/217 |

OTHER PUBLICATIONS

Irrigation Journal, Nov., 1993, p. 17.

Primary Examiner—Edward R. Cosimano
Attorney, Agent, or Firm—Steven J. Adamson

[57] ABSTRACT

A low power flow measuring apparatus, including a battery for generating a supply signal, a power management unit for producing from the supply signal a first voltage signal that is always enabled and a second and third voltage signal that are selectively enabled, a sensor powered by the third voltage signal for generating a data signal representative of a magnitude of a predefined parameter, and a controller in communication with memory and the sensor and powered by the second signal, for controlling a reading of the data signal from the sensor and the storage of a data value corresponding to the data signal in memory. Interrupt logic, powered by the first voltage signal, activates the power management unit, upon the occurrence of a predefined event, to enable the second and third voltage signals, thereby enabling the controller to take a reading from the sensor. After a reading is taken and the data value written to memory, the power management unit disables the second and third signals to save power. A serial data link is also provided to retrieve collected data values.

14 Claims, 5 Drawing Sheets

LOW POWER FLOW MEASURING DEVICE

FIELD OF THE INVENTION

The present invention relates to flow measuring devices and, more specifically, to low power battery operated flow measuring devices that achieve frequent sampling and extended life between battery replacements.

BACKGROUND OF THE INVENTION

Though the present invention is well characterized as a low power flow measuring device, the term "flow meter" is used herein for its simplicity and relationship to flow measuring.

As a flow meter, the low power flow meter of the present invention has many applications, some of which are discussed in more detail below and others of which are apparent from the description herein. A principle application, however, of the present invention is for water flow monitoring in irrigation systems, municipal water/sewer systems, environmental data collection and the like.

In this context, the present invention is particularly useful in arid regions, such as the American west, where water is scarce and the need to accurately measure and appropriately distribute water is of paramount importance. Currently, the division of water between agriculture, municipalities and environmental concerns is being reconsidered and new priorities established. Also, concepts such as a water market are being discussed. To facilitate appropriate resolution of these current concerns and corresponding future concerns, it is essential that technology be developed for accurately and efficiently measuring the use of our existing water supply. To achieve this end, measurements must be done with sufficient frequency, at distributed sites throughout a water system (i.e., including remote locations) and in an affordable manner. The collected data must also be readily available.

In response to this need, a plurality of water monitoring devices have been developed. These include multi-parameter and single-parameter data logging devices. To access remote locations, devices have been developed that are battery powered and, therefore, operate autonomously at the location in a water system where they are placed. A standard one of these prior art meters contains a sensor, a processor, memory and a display. Data is recovered in at least one embodiment by reading the display. In other embodiments, data may be recovered by transfer to a memory card or by download to an IBM-compatible computer.

Though known flow meters have made a significant contribution to the art, they are disadvantageous in that they are not sufficiently low power devices. As such they drain battery power relatively rapidly and provide either extended field life with very infrequent sampling or frequent sampling with a brief field life, where field life refers to the period of use between battery replacements.

One example of this type of device is a known flow meter that is capable of sampling once daily for approximately a year. One sample in 24 hours, however, is inappropriately long in many applications. For example, in the context of irrigation flumes, it is necessary to measure water flows every few minutes or less to accurately monitor flow and determine use. This known flow meter would last only a few days sampling at a requisite frequency. Such a short field life, or even a field life of a few months, would necessitate a disadvantageous expense for the purchase of new batteries and a disadvantageous use of labor to physically replace the batteries in all meters in a water system.

Furthermore, as higher sampling rates are achieved in extended field life devices, a need exist for means that efficiently transfer the increased amounts of collected data from the flow meter. This means must also be capable of operating in an extremely low power manner.

SUMMARY OF THE INVENTION

Accordingly, it is an object of the present invention to achieve a high, accurate sampling rate and an extended field life in a battery operated flow meter.

It is another object of the present invention to provide an efficient means of transferring collected data via an electronic communications link to a data processing device, in a manner that is minimally consumptive of power.

It is yet another object of the present invention to provide a durable and tamper resistant battery operated flow meter.

These and related objectives of the present invention are achieved by use of a low power flow measuring apparatus, including: a battery for generating a supply signal; a power management unit in communication with the battery for producing from the supply signal a first voltage signal that is always enabled and a second and third voltage signal that are selectively enabled; a sensor powered by the third voltage signal and adapted for generating a data signal representative of a magnitude of a predefined parameter; a controller in communication with memory and the sensor and powered by the second signal, for controlling a reading of the data signal from the sensor and the storage of a data value corresponding to the data signal in the memory; and interrupt logic powered by the first voltage signal for activating the power management unit, upon the occurrence of a predefined event, to enable the second and third voltage signals, thereby enabling controller to take a reading from the sensor; wherein after a reading is taken and the data value written to memory, the power management unit disables the second and third signals to save power.

Furthermore, bidirectional data transfer with a data processing device is also provided for recovering the data values and for setting the flow meter parameters.

The present invention also includes such features as providing RAM and A/D converter devices that have a lower power mode, providing Hall-effect sensors for non-invasive calibration and reset, and mounting circuitry directly to a flow meter housing. The present invention is capable of drawing less than 10E-6 Amp-hours during a sampling cycle.

A method of practicing the invention is also disclosed.

The attainment of the foregoing and related advantages and features of the invention should be more readily apparent to those skilled in the art, after review of the following more detailed description of the invention taken together with the drawings.

DETAILED DESCRIPTION

Figure 1:
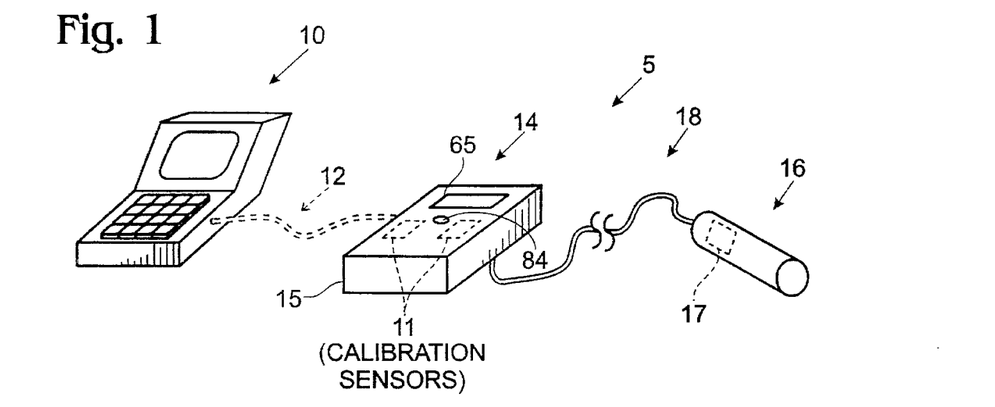
FIG. 1 is a perspective view of a flow meter and related components.

Referring to FIG. 1, a perspective view of a low power, battery operated, flow meter 14 integrated into a flow measuring system 5 is shown. In the system 5, a sensor 16 is connected to flow meter 14 to provide signals indicative of a parameter of interest and a data processing device 10 such as a computer or the like may be connected to flow meter 14 to recover collected data, though some data may also be recovered by reading same from a low power display 65.

The sensor 16 defines the type of data that can be monitored by flow meter 14 and thereby influences its applicability. The sensor 16 may be a pressure transducer, for example, for measuring flume or weir head which may be used to generate flow rate, etc. Though the present invention is primarily directed to flow measuring, the sensor 16 could also be a temperature transducer or any transducer that utilizes a resistive bridge.

In addition, sensor 16 preferably contains two two-stage differential operational amplifiers 17 for buffering a measurement signal. The first stage is a high input impedance, low output impedance buffer and the second stage provides a gain of 10.

Sensor 16 is connected to flow meter 14 via cable 18. The cable preferably includes two individually shielded twisted pairs. The AVCC and −V power signals (see below) are provided to the sensor in one of the twisted pairs while the differential sensor signal is propagated from the sensor via the other. An additional shield may be located around the two individually shielded lines for additional protection.

Depending on the application, sensor 16 may be placed in close proximity to or away from flow meter 14. For example, in measuring flow at a weir, the flow meter may be mounted in a stilling well with sensor 16 rigidly attached and extending downward therefrom to a position just below the weir crest. In other configurations, such as when the flow meter is submerged in a flume or positioned in a location that is difficult or dangerous to access, the flow meter 14 is placed at a more readily accessible location away from flow meter 14. The shielded cable 18 and differential signal permit placement of the sensor 16 up to 100 feet from flow meter 14 without deleterious effects on signal quality or power consumption.

As will be discussed in more detail below, flow meter 14 collects data from sensor 16 at programmed intervals and stores the collected data for subsequent retrieval by a user. Flow meter 14 also provides instantaneous displays of present flow or other programmed parameter in response to depression of button 84.

To retrieve collected data, the data is downloaded from non-volatile RAM to any data processing device that emulates the serial port of an IBM compatible computer. Design parameters include retrieving data with sufficient speed and holding to a minimum the energy required for data transfer. In a preferred embodiment, the data processing device 10 is an IBM compatible laptop computer because such computers and software therefor are readily available and they contain sufficient processor power and memory for the retrieval and sophisticated processing of large amounts of data. Though use of the serial port is contemplated because it facilitates data transfer in a manner that does not require significant flow meter power, there are other suitable methods of downloading collected data from memory and they will be apparent to one skilled in the art given the teachings herein. It should be recognized that linkage through a non-invasive IR link is contemplated, but such a linkage requires significant power and is, therefore, not practical in an extremely low power flow meter.

The flow meter 14 is enclosed in a durable, weather-tight plastic housing 15 rated as NEMA (National Electronics Manufacturers Association) 4X to withstand harsh environmental conditions. This housing and the arrangement of electronics 20 therein is discussed in more detail below with reference to FIG. 6.

The button 84 is positioned in housing 15 with a rubber boot covering it and an O-ring placed underneath it such that a water-tight seal is formed, thereby permitting, for example, temporarily submerged applications.

Two Hall effect sensors 11 are provided for calibration and reset and they are preferably located just under the housing so that they may be non-invasively accessed. Such an arrangement of sensor 11 also contributes to the integrity of the housing because the number of physical openings is reduced. Each of these sensors 11 is connected to a microcontroller (30 FIG. 2) and produces a logic low signal when a magnet (a magnetic field) is brought within close proximity thereto. For calibration, the individual enablement of one sensor is detected by the controller machine code which generates therefrom a positive offset for the measured sensor signal and stores that offset in the random access memory discussed below. Enablement of the other Hall effect sensor provides a negative offset in a similar manner. The controller machine code is programmed to reset an accumulated total flow in the random access memory when the sensors 11 are simultaneous enabled. Machine code for calibration and reset is generally known in the art.

Having generally described the overall flow metering system 5, the electronic circuitry and related features for realizing an extremely low power flow meter are now presented.

Figure 2:
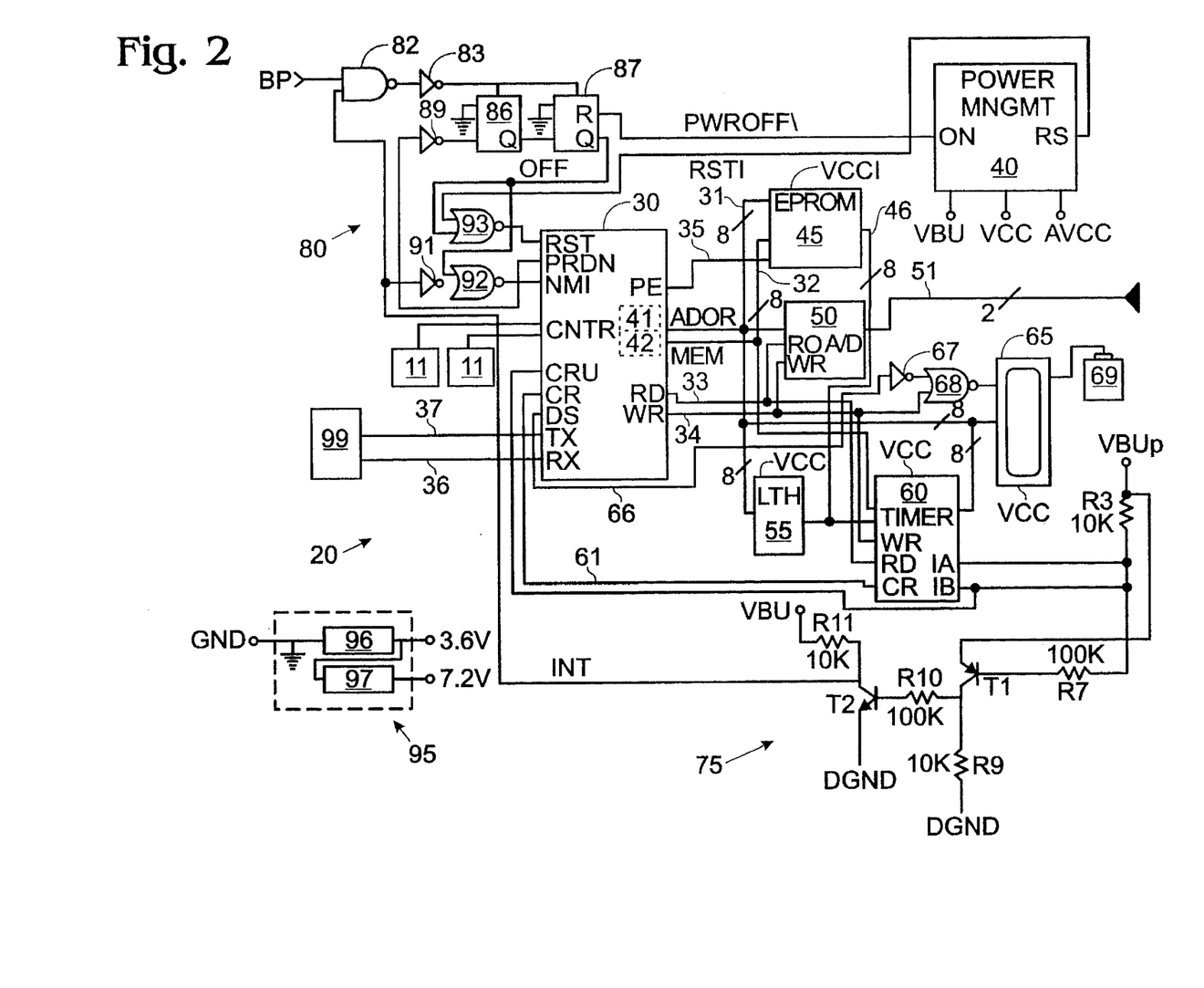
FIG. 2 is a block/schematic diagram of flow meter electronics.

Referring to FIG. 2, a block/schematic diagram of flow meter 14 electronics is shown. This circuit 20 provides a combination of integrated circuits, blocks representative of additional circuitry, combinational logic and analog circuitry that perform the necessary functions of a flow meter yet do so in a manner that is quite sensitive to power consumption. The structural relationship and interconnection of the various components is discussed first followed by a description of the several modes of operation.

The flow meter circuitry (hereinafter referred to generally as "circuit 20") comprises the microcontroller 30 (hereinafter referred to as "controller 30") such as a model No. 80C31 from Intel of Santa Clara, Calif., or the like. The 80C31 is a low power CMOS processor with no on-board programmable read only memory (PROM). In the configuration of FIG. 2, the separation of controller 30 and the PROM/EPROM (see below) facilitates customization of the circuit 20 for a particular user or application, though the inclusion of programmable ROM in controller 30 is contemplated.

The controller 30 is connected through 16-bit address bus 31, to an erasable programmable read only memory (EPROM) 45, an A/D converter block 50, a latch 55, a clock-timer with RAM (hereinafter referred to as "timer/RAM 60") and the display 65. The lower 8 bits of the address bus double as a data bus 32 which is connected to A/D converter block 50, latch 55 and display 65. Read (RD) and write (WR) enables are provided to A/D converter block 50 and timer/RAM 60 via lines 33 and 34, respectively, and the EPROM chip select, prom enable (PE), is provided to the EPROM 45 via line 35.

Controller 30 also controls serial data transmission to and from computer 10 via receive and transmit lines 36 and 37, respectively, as discussed in more detail below with reference to FIG. 5. A parallel-to-serial shifter register 41 internal to controller 30 is connected to transmit line 37 and a serial-to-parallel register 42 is connected to receive line 36.

EPROM 45 has 64 Kbytes of programmable memory within which the machine code for controller 30 resides. The EPROM 45 also contains look up tables that provide, for example, flow level, head height, and change in volume since the last measurement, in response to a converted sensor 16 signal. During an access of the lookup table the least significant 8 bits of the address are latched by latch 55 and held at the EPROM address lines so that the 8-bit output of the table can be transferred over the data bus 32 (the same lines used for address in the previous clock cycle).

The A/D converter block 50 receives the differential signal from sensor 16 on line 51. The block 50 includes an A/D converter and related circuitry that are described in more detail with reference to FIG. 3.

Figure 3:
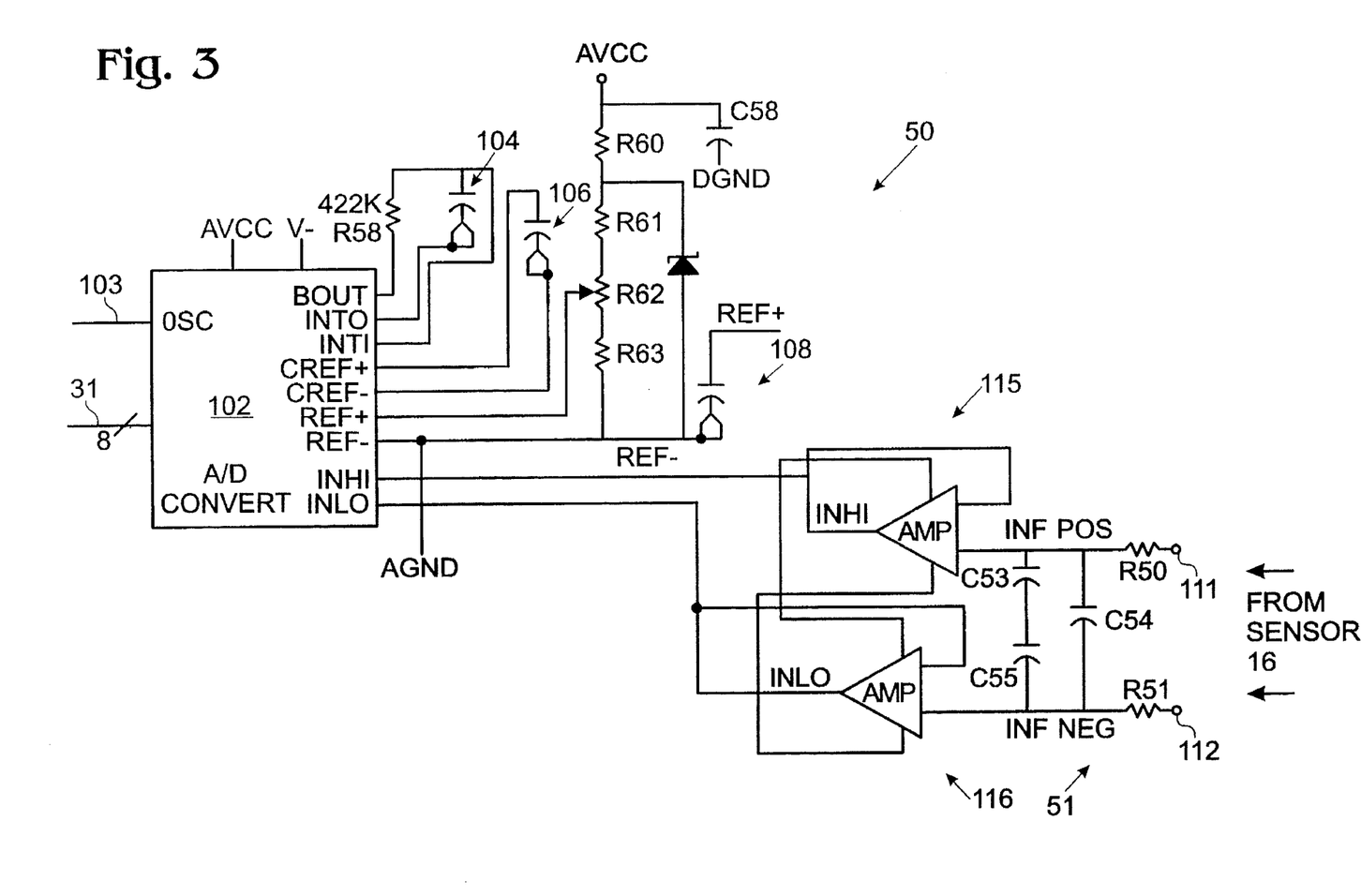
FIG. 3 is a schematic diagram of an A/D conversion block for the flow meter electronics of FIG. 2.

Referring to FIG. 3, a schematic view of the A/D conversion block 50 is shown. The A/D block 50 includes an A/D converter 102 such as model MAX135 made by MAXIM Semiconductors of Sunnyvale, Calif., or the like, that receives AVCC (analog VCC) and V− from power management block 40. This converter 102 is a 15 bit binary-output, low power CMOS converter with sufficient speed and accuracy for flow measuring applications. Supply current for converter 102 by itself is approximately 125 microAmps maximum during normal use and 10 microAmps in sleep mode. With the additional analog circuitry of FIG. 3, these values become approximately 200–250 during normal use and 100 in sleep mode. Sleep mode is a state entered by converter 102 at the request of controller 30 and is described in more detail below under the Operation headnote.

An oscillator signal for use in establishing a conversion cycle time is input on line 103. The generation of an oscillator signal is known in the art and taught, for example, by the manufacturers of A/D converter 102. The buffer amplifier output (BOUT) drives an integrator resistor R58 and is connected to both integrator input (INTI) and through a capacitor 104 to integrator output (INTO) to minimize noise. Reference capacitor-positive connection (CREF+) is connected to reference capacitor-negative connection (CREF−) through capacitor 106. This capacitor 106 stores a reference voltage, which is the voltage input from sensor 16 in the present application. The capacitor is preferably made of polypropylene or another material with similar low leakage. The negative reference voltage (REF−) is tied to analog ground (AGND) and the positive reference voltage (REF+) is set to preferably 0.523 V for a 60 Hz cycle and 0.629 V for a 50 Hz cycle through a voltage divider consisting of resistors R60–R63. The REF+ signal is filtered by capacitor 108 and both provides the appropriate scale and defines the integration period of converter 102 which is a successive approximator.

The differential signal from sensor 16 is propagated to A/D converter block 50 at ports 111 and 112 where it is input to a low pass filter formed by resistors R50–R51 and capacitors C53–C55. Two high input impedance, low output impedance buffer amplifiers 115–116 receive the positive and negative filtered input signals, respectively, for propagation to the A/D converter 102.

Referring again to FIG. 2, the timer/RAM 60 is preferably a model DS1386 from Dallas Semiconductor of Dallas, Tex., or the like. This semiconductor contains non-volatile RAM, a real time quartz clock, a watchdog timer, and an alarm function for system wake up, amongst other aspects. Timer/RAM 60 is connected to both the address 31 and memory bus 32 and to the EPROM via bus 46. Read and write enables and chip select are provided from the controller via lines 33, 34 and 61, respectively. It should be recognized that the use of latch 55, which is a common-latch for the non-volatile RAM and EPROM 45 (which are selected by different chip selects), facilitates a reduction in circuitry (it eliminates a latch and frees up a controller 30 control signal) and corresponding power draw.

Timer/RAM 60 has two external interrupts (real time clock (IA) and watchdog timer (IB) that are always active and pulled up to an 2.7 V supply (VBUp). The 2.7 V signal provides maintenance of the interrupts in a non-active logic high state in a manner that is less power consumptive than tying IA and IB to VBU. As discussed elsewhere herein, the meter 14 is woken up from off mode by the watchdog interrupt signal or by the button 84 output signal which are both connected to combinational logic 80 discussed below. The signal path to combinational logic 80 contains a level shifter 75 for shifting from VBUp to 5 V. The signal from level shifter 75 to logic 80 is termed the interrupt or INT signal.

The timer/RAM 60 also preferably includes 32 K of RAM. Amongst other features of the RAM, it experiences a current draw of approximately 80 mA during a RAM access and a sleep level current draw of approximately 6 microAmps.

The display 65 is a low power LCD display that is connected to the lower 8 bits of address bus 31. The display 65 is preferably a dual row 16 character display (which includes a matrix of picture elements) such as model DMC1202 from Optrex or the like. The display chip select signal is propagated via line 66 through invertor 67 where it is NORed 68 with the write enable. In response to the depression of button 84, as will be discussed below, the present flow and head and the most recently generated total accumulated flow volume are preferably displayed.

An optional +9 V battery 69 is preferably provided to power a backlight for the LCD display 65 so that readings may be taken at night. Power may be provided from the main lithium battery 95, though this latter arrangement will deplete the lithium battery at an undesirable rate.

Figure 4:
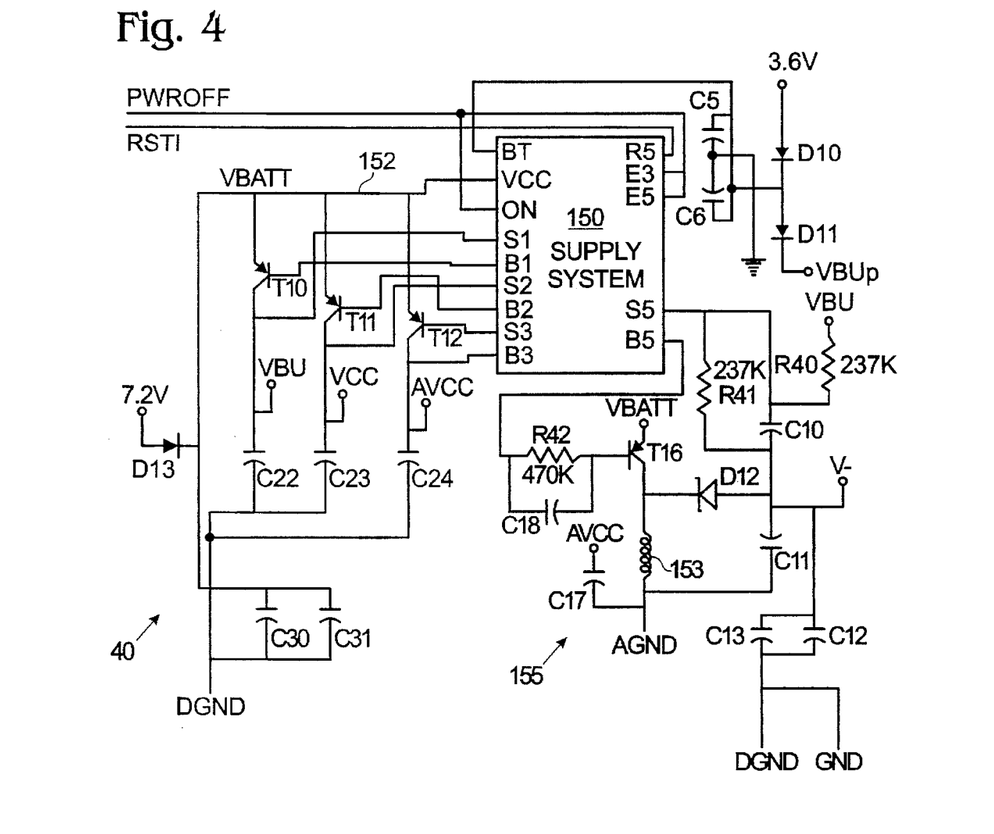
FIG. 4 is a schematic diagram of a power management block for the flow meter electronics of FIG. 2.

Referring to FIG. 4, the power management block 40 is shown. This block contains a low power CMOS battery powered supply system 150 that is preferably a MAX716 from Maxim Semiconductors or the like. This chip 150 has multiple regulated voltage outputs and microprocessor supervisory functions that are optimized for battery-powered supplies. The power management block 40 receives both a 7.2 V and a 3.6 V signal from battery pack 95. The 7.2 V signal is propagated through diode D13 to become VBATT on line 152 which has a value of approximately 6.5 V. This signal is propagated through a plurality of series pass transistors T10–T12 to achieve a VBU, VCC and AVCC signal. Each of the series pass transistor is controlled by a linear regulator in the power system chip 150. Capacitors C22–C24 and C30–C31 are bypass capacitors to reduce noise. While C31 is primarily a bypass capacitor, C22–C24 provide linear regulator stability in addition to bypass. The battery supply system 150 is configured such that VBU is always on to supply those components listed herein that remain on with power, while VCC, AVCC and V- are turned off when the flow meter 14 is between measurements.

The combination of resistors R40–R42, capacitors C10–C13 and C17–C18, transistor T16, diode D12 and inductor 153 form a switched DC to DC circuit 155 to generate −5 V which is needed for sensor 16 and converter 102. Such circuits are known in the art.

The 3.6 V signal from battery pack 95 is propagated through two diodes D10–D11 to produce a voltage VBUp of approximately 2.7 volts. The voltage drop across D10 is approximately 0.45 and across D11 is approximately 0.45 due to low currents. C5 and C6 are bypass capacitors, respectively. A midpoint between D10 and D11 is connected to BT of chip 150 to provide a reference voltage that is compared against VBATT. If VBATT falls below this reference voltage, then supply system 150 replaces VBU with VBUp (2.7 V).

Referring to FIG. 2, the power management block 40 is turned on by combinational logic 80. In the case of a watchdog interrupt, the INT signal (active low) is propagated to NAND gate 82. In the event of a button 84 push, a similar signal is propagated from the button to this NAND gate 82. The output of NAND gate 82 is propagated through invertor 83 and used to preset flip-flops 86 and 87 which drive high or inactivate the poweroff signal (PWROFF). The flip-flops 86 and 87 also serve to debounce a button 84 depression. Through this path the battery supply system 150 is turned from an off state to an on state. Upon receipt of PWROFF inactive, supply system 150 enables VCC, AVCC and V-, and generates a reset signal that is held low for 200 ms to permit stabilization of circuit 20. The reset signal is NORed at 93 with the OFF signal (complement of PWROFF) to reset controller 30 and INT is NORed at 92 with the OFF signal (after its propagation through invertor 91) to form a non-maskable interrupt (NMI) to controller 30. NORing with the OFF signal ensures that a logic high is not driving a logic low during the off mode, described below, which would rapidly drain power.

As stated above, power to the power management block 40 is provided by a lithium battery pack 95 or the like. In a preferred embodiment, the battery pack 95 includes two serially arranged 3.6 V lithium batteries 96, 97 which each provide 2.4 Amp-hours of power to produce a 7.2 V 2.4 Amp-hour cell. This power is dissipated generally as follows.

The present invention, in one embodiment, is capable of sampling every 100 seconds for a period of over a year without battery replacement. Given this observation, the immediately following calculated values must at least be true while actual values are more conservative of power. At the 1 measurement/100 sec rate of sampling, flow meter 14 makes (24 hours/day×60 min/hour×60 sec/hour)/100 sec/sample=864 samples a day. In a year the meter 14 makes 864 samples/day×365 days/year=315,536 samples. In addition, this sampling rate and field life is achieved while permitting 2 button pushes a day. Thus, flow meter 14 uses less than (2.4 Amp-hours/field life)/(315,536 samples/field life)= 7.6E-6 Amp-hours of power per sample, which is less than 7.6E-4 Amp-hours per 100 samples, and less than approximately 7.6E-6×30 days×864 samples/day=0.197 Amp-hours per month, again, sampling every 100 seconds.

Actual measured power dissipation values for flow meter 14 are as follows. During a standard "on mode" the circuit 20 without serial interface block 99 draws approximately 20 mAmps of current. In a standard "off mode" the circuit 20, so limited, draws approximately 15 microAmps. For one sample (one on mode period), the total power draw is 2.8E-6 Amp-hours and for one interval time (one off mode period), the power draw is 1.39E-6 Amp-hours. Thus, the consumed power for a complete sampling period which is the sum of the sample and interval draws is 4.2E-6 Amp-hours. This same draw for circuit 20 with serial interface block 99 is 5.8E-6 Amp-hours.

Figure 5:
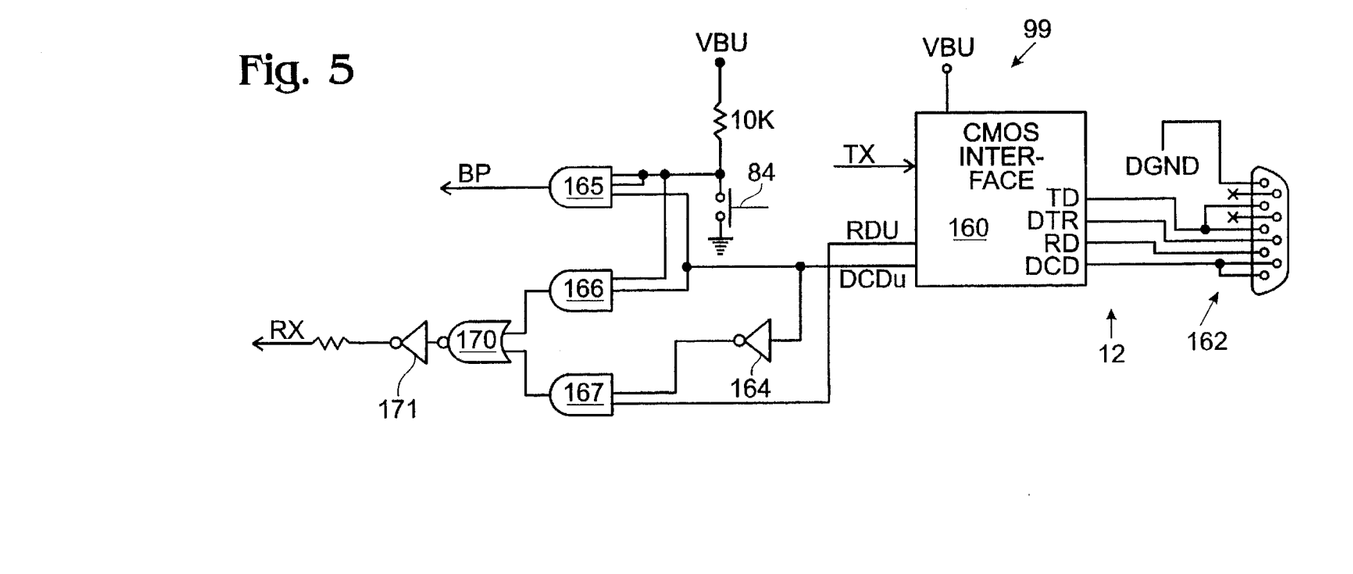
FIG. 5 is a schematic diagram of a serial interface block for the flow meter electronics of FIG. 2.

Referring to FIG. 5, a schematic diagram of serial interface block 99 is shown. The serial interface block 99 includes circuitry such as serial interface control chip 160 (hereinafter "interface chip 160") for interfacing between CMOS level voltages in flow meter 14 and standard RS-232 data transfer protocol voltages. The connection is made via link 12 (see FIG. 1) from the potentially 9-signal line serial port 162 which is connected to interface chip 160.

The interface control chip 160 includes a plurality of drivers and receivers and is preferably model No. MAX242 from Maxim Semiconductors or the like. In a preferred embodiment, only 3 of the available 9 lines are utilized and these lines are transmit (TD), receive (RD) and detector carrier data (DCD), though a standard null modem configuration is implemented.

Data to be transferred from the controller 30 is read fromRAM in timer/RAM60 and loaded into parallel-to-serial shift register 41 internal to the controller from where it is transferred over line 37 to interface chip 160. In interface chip 160, it is converted to its corresponding RS-232 level and propagated via the TD line to the data processing device. A transfer is initiated generally as follows.

When a link 12 having a data processing device 10 attached thereto is connected to port 162, the DCD signal is activated and a toggling signal is provided on the RD line. In interface chip 160, the DCD and RD signals are converted to their respective CMOS representations, DCDu and RDu, and DCDu is propagated directly to AND gates 165–166 and through invertor 164 to AND gate 167 while RDu is propagated to AND gate 167. DCDu serves to mask a button 84 push at AND 166 and gates the RD signal through AND 167. The presence of a toggling signal on RX line 36 combined with an interrupt is detected by controller 30 as a external data processing device interrupt. In response, controller 30 generates an acknowledge (a toggling signal) which is propagated to the external device via TD. The external device 10 can then send specific commands, such as a read followed by a specific address and block size or a write followed by a specific address, quantity and data.

During a data transfer, the serial input stream to the flow meter 14 (on line RD) is loaded into serial-to-parallel shift register 42 internal to controller 30 and is acted upon by controller machine code in a manner known in the art to process a read of data from or a write of data to flow meter 14. An aspect of flow meter 14 is to act as a slave to the external device 10, so that only minimal processing (such as data transfer between memory and the parallel-to-serial and serial-to-parallel registers) occurs, thereby minimizing power draw.

Upon completion of a measurement cycle, the external device propagates a data transfer complete which the controller generates a powerdown signal in response to.

FIG. 5 also illustrate logic for processing a depression of burgeon 84. The output of button 84 (active low) is propagated through AND gate 165 to form the button pushed (BP)

signal which is propagated to NAND gate 82. The output of button 84 is also propagated through gates 166–167 and 170–171 to the RX signal on line 36. The presence of a steady active low on RX line 36, in combination with an interrupt, is detected by controller 30 machine code as a button 84 depression.

Figure 6:
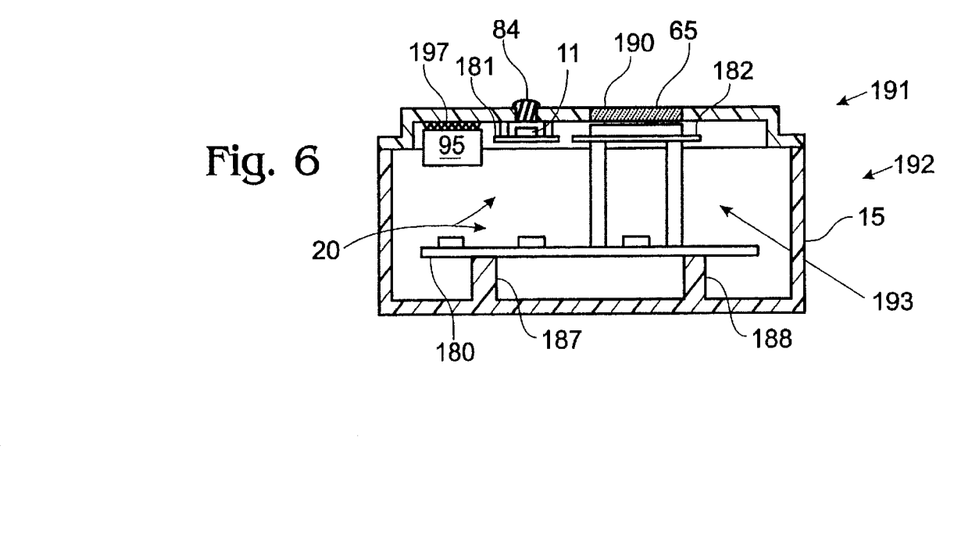
FIG. 6 is a cross-sectional view of flow meter electronics in a housing therefor.

Another aspect of the present invention involves the configuration of the electronics 20 in the housing 15.

Referring to FIG. 6, a cross-sectional view of flow meter 14 illustrating the location of circuit 20 therein is shown. Housing 15, as discussed above, is preferably made of NEMA 4X plastic or the like and comprises top 191 and bottom 192 portions. Circuit 20 is physically located on a plurality of interconnected circuit boards 180–182 and a majority of circuit 20 is located on circuit board 180 which is mounted directly to housing 15 protrusions 187 and 188. The display 65 is mounted on an elevated structure 193 so that it may be read through window 190. Button 84 and related water-tightness components are located in the top portion and Hall effect sensors 11 are located below and on opposite sides of button 84. Battery 95 is preferably connected by Velcro 197 or the like to the top portion 191 for easy access. It should be recognized that the circuit 20 is mounted directly in the housing which reduces materials and manufacturing costs.

OPERATION

Flow meter 14 is capable of performing several operations which include continuous monitoring, manual readout and serial data input/output transfer. These operations will be discussed with reference to FIGS. 7(a)–(b).

Figure 7A:
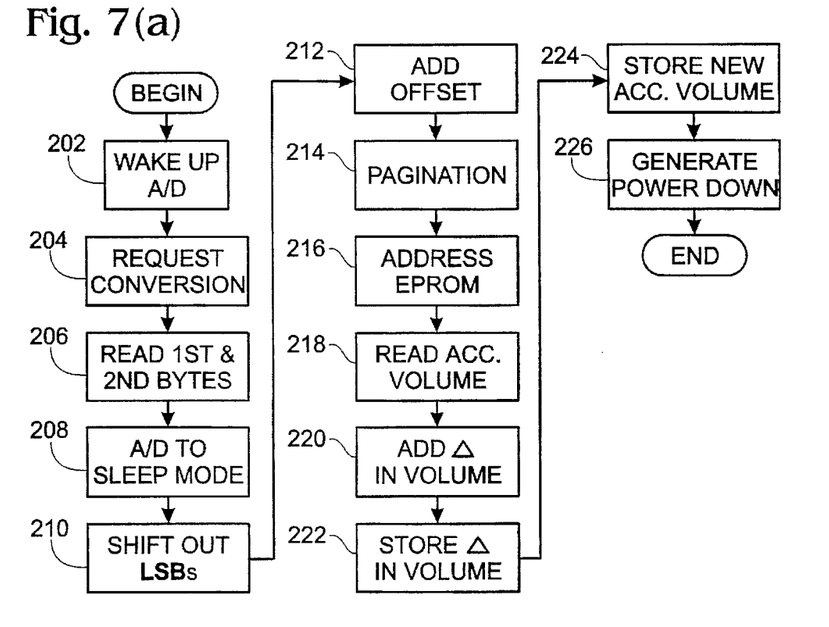
FIGS. 7(a)–7(b) are flowcharts of flow meter machine code for continuous and manual mode operation, respectively.

In continuous monitoring mode (illustrated in FIG. 7(a)), which is so named because it entails continuous sampling at fixed intervals, the watchdog timer in timer/RAM 60 times out and generates a signal which brings circuit 20 out of "off mode." It should be recognized that although the wake up interval is set to 100 seconds in one embodiment, the value of this parameter may be changed by one skilled in the art without departing from the low power teachings of the present invention (for example, using the real time clock in timer/RAM 60). The off mode is defined as that state of flow meter 14 between sampling where battery supply system 150 has disabled VCC, AVCC and V-such that VBU (and its 2.7 V variant VBUp) is the only enabled voltage. VBU is provided to flip-flops 86 and 87 so that the ON input of chip 150 is driven low (PWROFF enabled), to combinational logic 80, to button 84, and to serial interface block 99. VBUp is provided to IA and IB and to level shifter 75. In addition, non-volatile RAM in timer/RAM 60 maintains its contents (calibration factors, accumulated totals, watchdog wake up time, real clock time, logged values (defined below), and other downloaded information, etc.) via an internal battery.

The INT signal generated by the watchdog timer is propagated through the level shifter 75 to the preset of flip-flop 87 which disables PWROFF which in turn causes the battery supply system 150 to enable circuit 20, by enabling VCC, AVCC and V- in addition to VBU. The battery supply system 150 propagates a reset signal that is held active for 200 ms to controller 30 to insure proper stabilization of the hardware and properly initiate a firmware cycle.

Referring to FIG. 7(a), upon deactivation of the reset signal, controller 30 accesses its machine code in EPROM 45 and begins executing that code. In step 202, controller 30 propagates a wake up signal to A/D converter 102 which brings the A/D converter out of low power sleep mode. Converter 102 then executes an initial conversion cycle to reset its registers and purge capacitor voltages. Controller 30 then requests, in step 204, a conversion which A/D converter 102 responds to by converting the signal at INHI and INLO, the differential signal from sensor 16, and sending an end of conversion (EOC) signal back to controller 30 when done.

The 15-bit converted value (in which less than 15 bits may be used) is stored in two 8-bit registers in A/D converter 102. These registers are individually addressed by controller 30, in step 206, in a manner known in the art and after their contents is transferred to the controller for further processing the controller propagates a signal to the converter 102, in step 208, to cause it to reenter sleep mode. The processing in controller 30, depending on a particular application, may include a shift, in step 210, to eliminate some of the least significant bits, such as a 4 bit shift right, and the addition, in step 212, of an offset value from the Hall effect sensors 11 (stored in RAM), such as a 8 bit offset value. Pagination and the like for external memory access may also be performed (step 214).

The processed converter 102 output is then used, in step 216, as an address for the EPROM 45 look up table. Preferably, the look up table includes a flow rate, head and change in volume since the last measurement (based on a preselected sampling rate and a flow level corresponding to a measured head). During continuous mode only the change in volume since the last measurement is read and utilized. The previous accumulated total is read from RAM, step 218, and added to the present change in volume, step 220. The present change in volume is then written to a specific region of RAM, in step 222, and the new total accumulated total volume is written to the location of the previous accumulated total volume, in step 224.

In step 226, controller 30 generates a powerdown (PRDN) signal that is propagated through invertor 89 to flop-flops 86 and 87 to turn off circuit 20. This signal activates the PWROFF signal which causes battery supply system 150 to turn off VCC, AVCC and V- such that the circuit 20 again enters off mode.

Figure 7B:
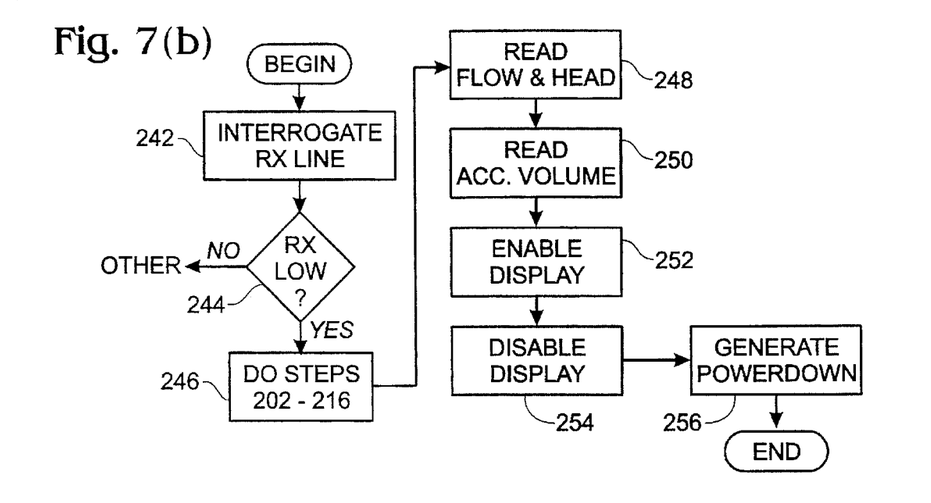

In another operation, termed "manual readout" because it is initiated by a user, the user depresses button 84 which propagates a signal through AND gate 165 and NAND 82 to turn on battery supply system 150 in the manner described above.

Upon the deactivation of reset, the controller 30 begins executing the machine code and at step 242 interrogates the RX line 36 for a steady state logic low level. If this signal is high, the interrupt must have been generated by the timer/RAM 60. If this signal is toggling, then an external data processing device is attempting to make communication.

In response to an affirmative determination at step 244, the A/D converter 102 is woken up and a sensor 16 measurement is taken in the same manner discussed above with steps 202–216. These steps are generally designated as step 246. In step 248, the present flow and head levels that correspond to the measured signals are read from EPROM 45 and in step 250, the accumulated total volume is read from RAM. In step 252, display 65 is enabled via invertor 67 and NOR gate 68 and the present flow and head, and stored accumulated total volume are preferably displayed. It should be recognized that this data is displayed in BCD format and to reduce the number of processor steps, the look up table values and mathematical operations discussed herein may be performed in BCD format.

After a delay of preferably 4–5 seconds, the display is disabled, step 254, and the controller 30 generates the powerdown signal, step 256.

In yet another mode of operation of flow meter 14, serial input/output data transfer is performed. This transfer is discussed generally above with reference to FIG. 5. More specific operations of the data transfer mechanism of the present invention include the following.

In a preferred embodiment, individual change in volume measurements, as described above, are stored sequentially in a predefined address in RAM and a count of the number of entries is maintained by a controller 30 register. Pointer registers in controller 30 may, therefore, be set to the starting and ending addresses of this data. During a transfer, the external device reads a controller register that has the size of data in RAM. The external device decides how much of this data to transfer at a time and then sequentially requests desired size transfers until all of the data has been transferred. This feature of retrieving individual change in volume measurements permits software in the external device or elsewhere to plot graphs, for example, of flow (change in volume) versus time. Each entry in RAM is preferably stored with 1 byte of time stamp and 4 bytes of subtotal data for an overall record length of 5 bytes.

In the opposite direction, the external device may transfer information to the meter 14. For example, the look up table EPROM 45 may be rewritten and this is achieved in essentially the reverse manner as a read. A specific start address is loaded from the external device to a controller pointer register as well as a data count. Specific blocks are then transferred from the external device through the controller to the EPROM. The external device may also write to other registers in the controller and outside the controller, such writing an offset value for the A/D converter. Programming techniques for accomplishing these transfers, given the teachings of the circuitry and signal exchange discussed herein, would be apparent to one skilled in the art.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A low power flow measuring apparatus, comprising:
   a housing;
   battery means positioned within said housing for generating a supply signal;
   power management means in communication with said battery means for producing from said supply signal a first voltage signal that is enabled during an OFF State and an ON State and second and third voltage signals that are enabled only during the ON State;
   sensor means powered by said third voltage signal and adapted for generating a data signal representative of a magnitude of a predefined parameter;
   control means in communication with memory means and said sensor means and powered by said second signal, for controlling a reading of said data signal from said sensor means and the storage of a data value corresponding to said data signal in said memory means;
   interrupt means powered by said first voltage signal for activating said power management means, upon the occurrence of a predefined event, to enable said second and third voltage signals, thereby enabling said control means to take a reading from said sensor means, wherein after a reading is taken and said data value written to memory means, said power management means disables said second and third signals; and
   Hall effect sensor means in communication with said control means and mounted inside said housing is such a manner as to permit magnetic access to said sensor means through said housing for setting a predefined parameter within said apparatus.

2. The apparatus of claim 1, further comprising:
   bidirectional data transfer means for exporting a data value to a data processing device.

3. The apparatus of claim 1, further comprising:
   analog to digital conversion means in communication with said sensor means and said control means and powered by said second voltage signal for converting an analog signal from said sensor means to a digital signal for said control means.

4. The apparatus of claim 1, comprising:
   time-out based interrupt logic for generating an interrupt at said interrupt means; and
   an external button and logic therefor for generating an interrupt at said interrupt means upon depression by a user.

5. The apparatus of claim 1, wherein said housing is water-tight and wherein said power management means and said control means are provided on printed circuit board mounted directly to said housing.

6. The apparatus of claim 1, wherein said sensor means comprises two-stage differential operational amplification means and a differential output.

7. The apparatus of claim 1, wherein said second signal is VCC and said third signal includes an analog differential voltage.

8. The apparatus of claim 1, wherein said power management means further comprises means for producing a low power pull-up voltage of less than 3.5 V.

9. The apparatus of claim 8, further comprising a level shifting means for shifting from said low power pull-up voltage to a voltage greater than 4.0 V.

10. A low power flow measuring apparatus, comprising:
    battery means for generating a supply signal;
    power management means in communication with said battery means and operating in both an OFF State and an ON State for producing from said supply signal a first voltage signal that is enabled during both the OFF State and ON State and a second and third voltage signal, at different levels from one another, that are enabled only during the ON State;
    sensor means powered by said third voltage signal for sensing a parameter indicative of liquid flow and generating a data signal representative of that sensed parameter;
    control means in communication with memory means and said sensor means and powered by said second voltage signal, for controlling a reading of a data signal from said sensor means and the storage of a data value corresponding to that data signal in said memory means;
    interrupt signal processing means powered by said first voltage signal for signalling said power management means, upon receipt of an interrupt signal, to enable said second and third voltage signals, thereby enabling said control means to take a reading from said sensor means, wherein after a reading is taken and said data value written to memory means, said power management means disables said second and third signals;

self-powered time-based interrupt signal generating means for generating said interrupt signal after passage of a predefined amount of time; and reduced level logic high producing means in communication with power management means and at least one input of a component of said apparatus for producing a reduced level pull-up voltage to pull-up said input during said OFF State in a manner that conserves power consumption.

11. The apparatus of claim 10, further comprising:

bidirectional data transfer means for exporting a data value to a data processing device.

12. The apparatus of claim 10, further comprising:

analog to digital conversion means in communication with said sensor means and said control means and powered by said second voltage signal for converting an analog signal from said sensor means to a digital signal for said control means.

13. The apparatus of claim 11, comprising:

an external button and logic therefor for generating said interrupt signal upon depression by a user; and data transfer interrupt logic for generating said interrupt signal upon connection of an active data processing device at said bidirectional data transfer means.

14. The apparatus of claim 10, further comprising:

combinational logic coupled between a component powered by said first voltage signal and a component powered by said second voltage signal for buffering a signal propagated from said first voltage powered component so that that signal does not driving a sink at said second voltage powered component during said OFF State.

* * * * *